R. BJERREGAARD.
FILM.
PLICATION FILED FEB. 26, 1912.
1,130,702.
Patented Mar. 9, 1915.
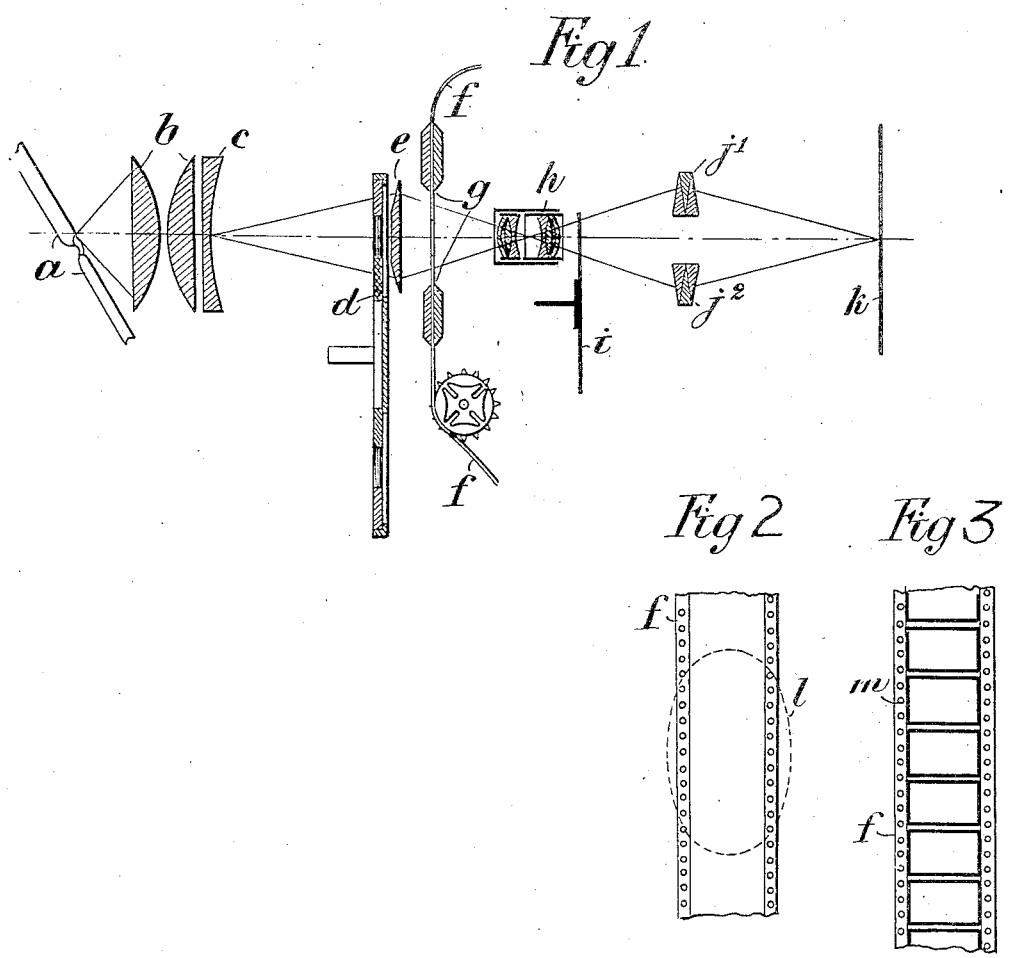

UNITED STATES PATENT OFFICE.

RASMUS BJERREGAARD, OF COPENHAGEN, DENMARK.

FILM.

1,130,702. Specification of Letters Patent. Patented Mar. 9, 1915.

Application filed February 26, 1912. Serial No. 680,062.

*To all whom it may concern:*

Be it known that I, RASMUS BJERREGAARD, director, a subject of the Kingdom of Denmark, residing at No. 22 Tordenskjoldsgade, Copenhagen, Denmark, have invented certain new and useful Improvements in Films; and I do hereby declare the following to be a full, clear, and exact description of the invention, such as will enable others skilled in the art to which it appertains to make and use the same.

In apparatus for projecting animated pictures in their natural colors, employing a film provided with series of consecutive pictures, corresponding in number to the number of basic colors used, the pictures projected do not appear with distinct, clear and uncolored outlines, while the outlines of the pictures of a series merge together.

The object of the present invention is to obviate this defect, and to this end each of the single pictures of the film is provided with a non-transparent black frame, which frames are exactly of the same size and separate the consecutive pictures from each other. The frames must be made during the copying of the film by means of templet and extra illumination, as otherwise the frames are not sufficiently black.

The invention is illustrated in the accompanying drawing, wherein—

Figure 1 represents diagrammatically a vertical section through an apparatus for projecting animated pictures in their natural colors, Fig. 2 represents the light spot produced by said apparatus upon the film, and Fig. 3 represents a fragment of a film.

In Fig. 1, $a$ is the source of light, $b$ an ordinary condenser, $c$ a cylinder lens arranged in front of the condenser, $d$ a rotary color-filter, $e$ a double prism, $f$ the film, $g$ the window of the apparatus, $h$ the objective, $i$ the ordinary shutter, $j'$ $j^2$ apochromatic prisms and $k$ the picture-screen.

The cylinder-lens $c$ is so cut and arranged, that the light rays passing through it will form an oval light-spot $l$ (Fig. 2), the outline of which encircles the three pictures of the film $f$ simultaneously illuminated so that all parts of said pictures are equally illuminated.

In order to prevent the outlines of the three pictures simultaneously illuminated from merging into each other, which would cause the outline of the picture projected onto the picture-screen to be indistinct and colored, each individual picture of the film is provided with a non-transparent black frame $m$ (Fig. 3). Said frames separate the consecutive pictures from each other and as all of said frames are of exactly the same size all of said pictures will occupy exactly the same area so that the outlines of the three pictures simultaneously illuminated will exactly coincide. Of course the outline of the picture projected onto the picture screen will be clean, distinct and uncolored.

The black frames can only be produced by means of a special copying-machine and templets through which light passes during the copying process.

Having now described my invention, what I claim as new and desire to secure by Letters Patent is:—

A film for the projection of animated pictures in their natural colors provided with series of consecutive pictures, corresponding to the number of basic colors used, each of said pictures being framed by a non-transparent black frame, said frames being all of the same size and separating the single pictures from each other, substantially as described and for the purpose specified.

In testimony whereof, I affix my signature, in presence of two witnesses.

RASMUS BJERREGAARD.

Witnesses:
MARCUS MÖLLER,
CH. MARTENS.